April 30, 1935.                M. FREY                  1,999,589
APPARATUS FOR SEPARATION OF SOLID COMBUSTION RESIDUES FROM COMBUSTION GASES
                    Filed Dec. 24, 1930          3 Sheets-Sheet 1
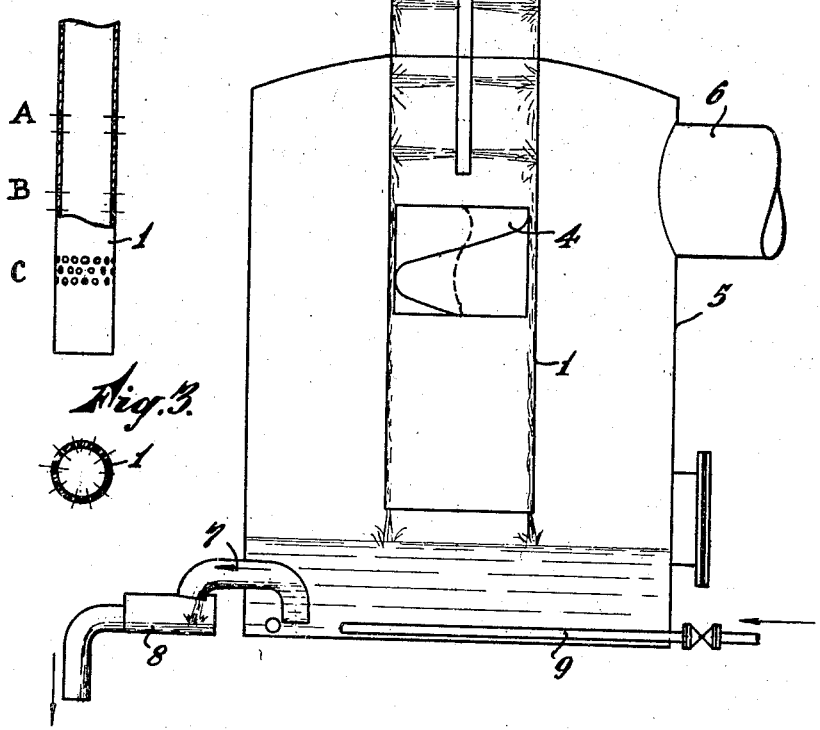
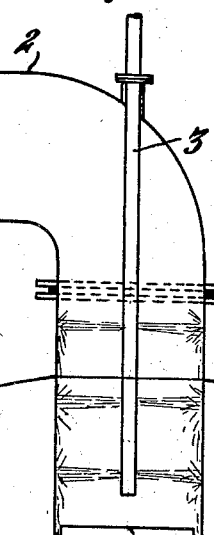
Inventor
Mendel Frey
per
Attorney

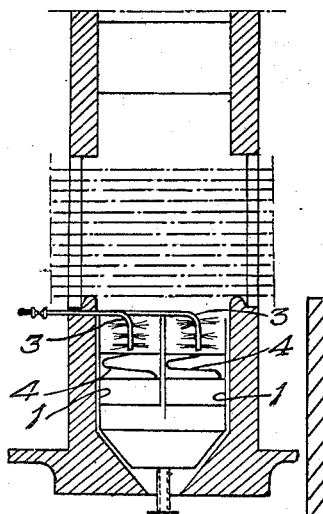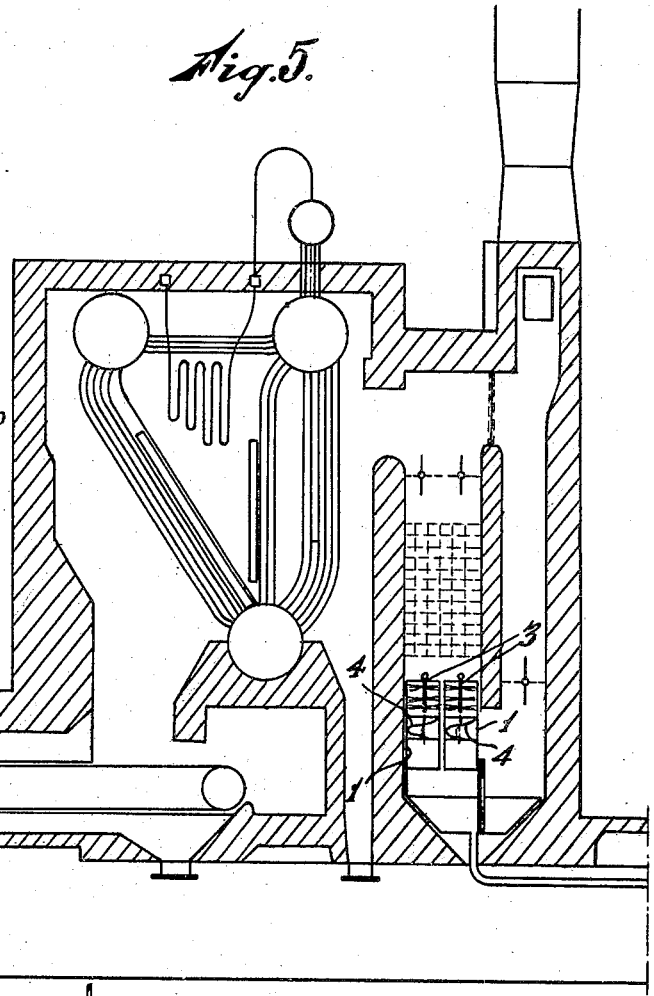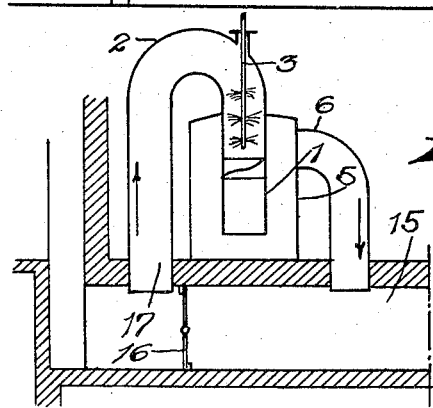

April 30, 1935.　　　　M. FREY　　　　1,999,589
APPARATUS FOR SEPARATION OF SOLID COMBUSTION RESIDUES FROM COMBUSTION GASES
Filed Dec. 24, 1930　　　3 Sheets-Sheet 3
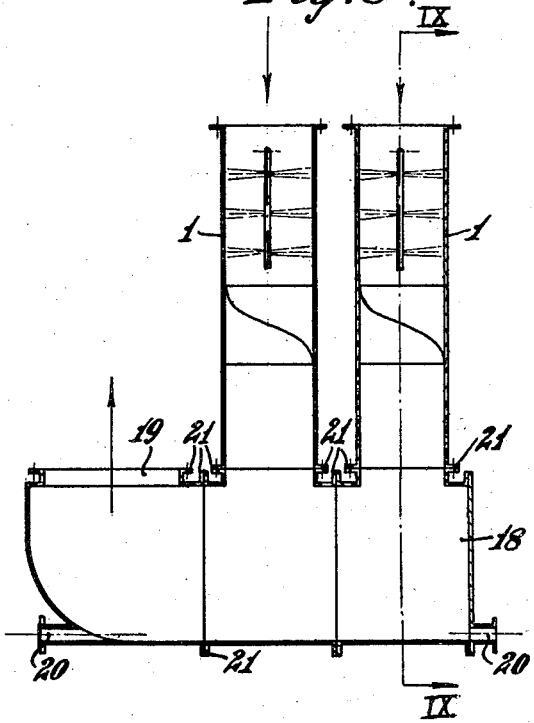
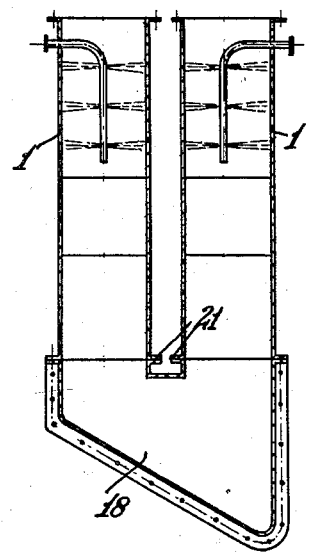
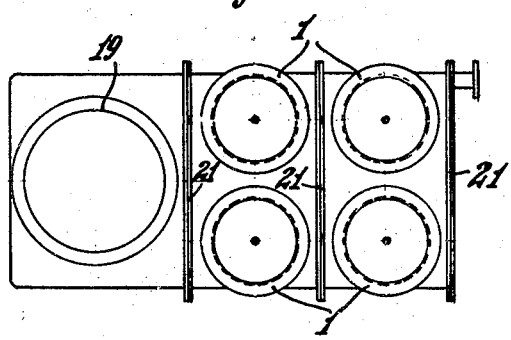
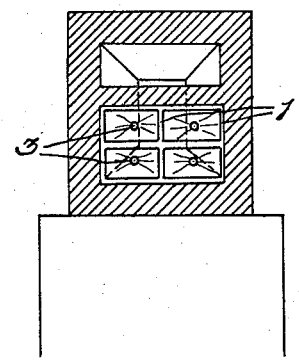
Inventor
Mendel Frey
per [signature]
Attorney Patented Apr. 30, 1935

1,999,589

UNITED STATES PATENT OFFICE 1,999,589

APPARATUS FOR SEPARATION OF SOLID COMBUSTION RESIDUES FROM COMBUSTION GASES

Mendel Frey, Dordrecht, Netherlands

Application December 24, 1930, Serial No. 504,544
In the Netherlands July 31, 1930

2 Claims. (Cl. 183—22)

This invention relates to apparatus for separating the solid particles from combustion gases.

Various types of apparatus for separating the solid particles from combustion gases are known and amongst these there exist centrifugal washing devices. In this latter type of apparatus a spiral motion is imparted to the combustion gases so that the solid particles are separated by being flung outwardly onto the walls of the apparatus. At the same time, water is sprayed into the apparatus to assist the separation of the particles and collect the same.

In some wet separators as heretofore constructed a very fine dispersion of the water was effected in order to obtain a good contact of the water with the fine dust particles. Thus fine nozzles were often employed which projected the water through the gases in the form of spray. The use of fine nozzles, however, has a threefold disadvantage, inasmuch as, firstly, due to the atomization of the water in the midst of the hot gases a considerable quantity of the water is uselessly evaporated, secondly, the nozzles are particularly susceptible to obstruction on account of their fineness, and thirdly a considerable quantity of the washing water is carried away with the gas stream, the sheet iron parts of the flue being eventually damaged thereby.

Furthermore, in many of the known wet separators, the washing liquid is projected in a direction opposed to the flow of the combustion gases for the purpose of more efficiently washing the same. Such a method, however, is unsuitable for use in cases where the gases flow through the flues at high speed since the spray tends to obstruct their flow.

The object then of the present invention is to obviate the aforesaid disadvantages and at the same time, to provide a separator which is particularly adapted for use in cases where the flow of the gases through the flues is extremely rapid, the arrangement being such as to provide the minimum obstruction to the gases.

To this end, according to the invention, a spiral motion is imparted to the gases and water is projected from a point or points within a tube through which the said gases pass, to the walls of the said tube in the form of compact jets, substantially no atomization of the water taking place until the same strikes the said walls, the water passing along the walls in the form of a fine film and collecting the solid particles flung to the walls by centrifugal force.

In order to obtain the water film additional excess water may be used for mixing with the fuel gases.

Dust separators for application of the method according to the invention can be of very simple construction, they require only a comparatively trifling water consumption and besides the pressure loss caused by this device is small, whilst the devices can be built-in in existing installations.

The spiral whirling motion of the flue gases may be obtained by a special arrangement, for instance by locating a spiral or helicoidal vane in the passage of the combustion gases, whilst this motion can also be effected by determining the form and the dimension with respect to the quantity of gas, flowing through, in such a way that the spiral motion results naturally and without other assistance. This motion can also be obtained with a cylindrical flue passage by introducing the gas in a tangential direction.

Also the mixing with water and the creation of the water film can be attained in different manners.

In a suitable arrangement for carrying out the invention, the tube or flue in which the spiral motion takes place, is provided with a central tube through which water under pressure is supplied, the said tube being provided with apertures or nozzles from which the water is ejected. The said apertures or nozzles are sufficiently large to project the water in compact jets. In this way the water is partly divided into very fine drops as soon as it strikes against the wall and mixes with the combustion gases, while a part immediately forms a water film flowing down along the wall, in which water film the solid particles driven by centrifugal force to the wall and the waterdrops are taken up and drained off. Due to the relatively large size of the apertures or nozzles it is practically impossible for the same to become obstructed.

The apparatus according to the invention can also serve for the removal of sulphur-dioxide by any chance present in the combustion gases. In view of the permanent presence of sulphur in coal it is recommended to manufacture the part of the channel and the device for supply of water in question of acid resisting material.

Ash traps for application of the method according to the invention can be of very simple construction, and they require only a comparatively trifling water consumption. In addition, the pressure loss caused by this device is small, whilst the devices can be built into existing installations.

In the accompanying drawings forming part hereof, several embodiments of the invention are disclosed.

Figure 1 shows a diagrammatical view in section of a device according to the invention;

Figure 2 is a detail partly in section;

Figure 3 is the detail of Figure 2 in cross section;

Figure 4 is a device according to the invention applied to a flue, whilst

Figures 5, 6 and 7 disclose how a device according to the invention is built into a flue of a boiler;

Figures 8, 9 and 10 ultimately represent in two vertical sections respectively and in a plan view an embodiment of a device which is constructed with elements assembled together by means of bolts.

The apparatus according to Figure 1 consists of a vertical tube 1 which is connected with the flue by means of a bend 2. The cross section of the tube 1 is preferably not larger than that of the flue. In the tube 1 is disposed a water supply pipe 3 having a closed end through which water can be supplied under pressure and which is provided with apertures as is shown in the Figures 2 and 3, from which at the places A, B and C water may be ejected with violence to the wall of the tube 1. Further a helicoidal vane 4 is placed in the tube 1. The tube 1 terminates just above the bottom of a closed receptacle 5 which is provided with an outlet 6. The combustion gases which pass through the bend 2 into the vertical tube 1 are mixed with the water that is atomized against the wall of tube 1, so that the solid particles are made heavier. Then the gases are brought in a spiral motion by means of the helicoidal vane 4, so that they will cover a longer path through the tube 1 and the heavier particles will be flung to the wall owing to the centrifugal force. Along this wall a water film is formed by the water in which the particles are taken up and by which they are drained off downwardly. The combustion gases are discharged from the receptacle through the outlet 6 whilst the water and the solid combustion residues accumulate in the lower part of the vessel and are drained off through an outlet pipe 7 and an open drain box 8. Sludge tends to accumulate on the bottom of receptacle 5 and may clog the opening of outlet pipe 7. By means of a pipe 9 terminating near the inlet of pipe 7, water may be ejected from pipe 9 so as to keep the opening of the pipe 7 clear and free, and thus prevents obstruction of the latter.

It should be remarked here that in connection with the examples of Figures 1 and 3 that the water film results from the injected water from the tube 3, but that with these and other installations the water film can also be obtained by a separate supply of water.

In Figure 4 an embodiment is shown, in which a device according to Figure 1 is disposed in connection with the flue 15 of a boiler leading to the stack. In the flue 15 a damper (valve) 16 or movable partition is placed. In front of the damper 16 the flue is connected to the bend 2 of the device by means of a tube 17, while the outlet 6 of the device interconnects with the flue at a place behind the damper.

With the boiler installation shown in Figures 5, 6 and 7 a similar device is employed to that shown in Figure 1. The device which is entirely built-in in the flue of the boiler consists of four tubes 1, each with a water supply pipe 3 and a helicoidal vane 4.

In the device according to Figures 1, 4, 5 or 6 the position of the helicoidal vane and the water supply pipe may be reversed (interchanged).

In the example according to Figures 8, 9 and 10 the tubes 1 are mounted on a frame 18 consisting of three separate inter-communicating compartments, the member 18 is provided with an outlet 19 for the combustion gases and of connections 20 for the discharge of the water injected into the device and containing the combustion residue.

The elements of which the device consists are provided on the connecting place with flanges 21 which serve for connecting the separate elements to a fixed unit, for instance by means of thread bolts.

This embodiment makes it possible to keep in stock the elements required for the assembly of the device according to the invention in order to deliver them when required. In this way the capacity of the device can be fitted to the boiler installation, for which it is intended. If for instance, the passage of one of the tubes 1 is calculated for the discharge of the combustion gases of a boiler installation with a firing capacity of one ton fuel per hour, one single section of the frame 18 being sufficient for said capacity. Such a single section is shown in Figure 9 which is a vertical section on the line IX—IX of Figure 8.

If required in this case one of the tubes 1 can be employed for the supply of the combustion gases from the fireplace and the other tube 1 as discharge for the gases, cleansed of the solid particles.

Devices of large capacity are composed according to the invention of two or more sections of the frame 18, with the corresponding tubes 1 assembled to one single unit.

I claim:—

1. Apparatus for separating the solid particles from combustion gases containing them, including in combination, a receptacle having a channel therethrough of which at least a portion of its length is subdivided into a plurality of parallel channels disposed in substantially upright position, means for imparting a whirling motion to the gases in each of said parallel channels in order to project the solid particles of the gases centrifugally against the walls thereof while said gases pass downward through the channels, said means comprising a stationary helicoidal vane disposed in each of said parallel channels and having the axis thereof corresponding with the axis of the respective channel in which it is located, and a water supply tube disposed directly above the helicoidal vane in each of said parallel channels radially projecting a plurality of continuous, solid and merged jets of water in the form of a radially divergent and continuous water curtain directly against the interior wall in each of said parallel channels above the helicoidal vane therein and thereby simultaneously producing a continuous and unbroken sheet or veil of water trickling down upon said interior wall in each of said channels and a zone of rebounding water spray adjacent the sheet or veil of water on said interior wall therein in order to entrain the solid particles of the gases in the water trickling down on said interior wall, the helicoidal vane in each of the parallel channels making contact with the gases solely below the water jets in substantially washed and cleaned condition of said gases.

2. Apparatus for separating the solid particles from combustion gases containing them, including in combination, a receptacle having a channel therethrough of which at least a portion of its length is substantially upright in position, means for imparting a whirling motion to the gases in the upright portion of the channel in order to project the solid particles of the gases centrifugally against the walls of said channel while said gases pass downward through the channel, said means comprising a stationary helicoidal vane in said channel whose axis corresponds with the axis of said upright portion of the channel, and a water supply tube disposed directly above said helicoidal vane within said channel radially projecting a plurality of continuous, solid and merged jets of water in the form of radially divergent and continuous curtain directly against the interior wall of said upright channel portion above said helicoidal vane and thereby simultaneously producing a continuous and unbroken sheet or veil of water trickling downward upon said interior wall and a zone of rebounding water spray adjacent the sheet or veil of water on the wall in order to entrain the solid particles of the gases in the water trickling down upon said wall, the helicoidal vane making contact with the gases solely below said water jets in substantially washed and cleaned condition of said gases.

MENDEL FREY.